United States Patent
Lin

(10) Patent No.: US 9,547,136 B2
(45) Date of Patent: Jan. 17, 2017

(54) OPTICAL FIBER HOLDING DEVICE AND OPTICAL FIBER COUPLING CONNECTOR

(71) Applicant: HON HAI PRECISION INDUSTRY CO., LTD., New Taipei (TW)

(72) Inventor: I-Thun Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/748,585

(22) Filed: Jun. 24, 2015

(65) Prior Publication Data

US 2016/0041351 A1 Feb. 11, 2016

(30) Foreign Application Priority Data

Aug. 5, 2014 (TW) .............................. 103126671 A

(51) Int. Cl.
| | |
|---|---|
| *G02B 6/36* | (2006.01) |
| *H04B 10/00* | (2013.01) |
| *H04B 10/04* | (2006.01) |
| *H04B 10/12* | (2006.01) |
| *H04B 10/06* | (2006.01) |
| *G02B 6/42* | (2006.01) |

(52) U.S. Cl.
CPC ........... *G02B 6/4204* (2013.01); *G02B 6/4214* (2013.01); *G02B 6/4231* (2013.01); *G02B 6/3652* (2013.01); *G02B 6/423* (2013.01); *G02B 6/4249* (2013.01); *G02B 6/4292* (2013.01)

(58) Field of Classification Search
CPC ....... G02B 6/4204; G02B 6/4214; G02B 6/34; G02B 6/4231

USPC ........ 385/88, 89, 92, 93; 398/139, 200, 201, 398/212, 214

See application file for complete search history.

(56) References Cited

U.S. PATENT DOCUMENTS

| | | | | |
|---|---|---|---|---|
| 7,063,467 | B2 * | 6/2006 | Nagasaka | G02B 6/4214 385/88 |
| 8,588,559 | B2 * | 11/2013 | Wu | G02B 6/136 385/14 |
| 8,805,138 | B2 * | 8/2014 | Nishimura | G02B 6/4214 385/39 |
| 2008/0008419 | A1 * | 1/2008 | Krahenbuhl | G02B 6/32 385/33 |
| 2012/0134626 | A1 * | 5/2012 | Lin | G02B 6/4292 385/33 |
| 2012/0257860 | A1 * | 10/2012 | Li | G02B 6/3858 385/83 |
| 2013/0259431 | A1 * | 10/2013 | Charbonneau-Lefort | G02B 6/4214 385/89 |

* cited by examiner

*Primary Examiner* — Robert Tavlykaev
(74) *Attorney, Agent, or Firm* — Zhigang Ma

(57) ABSTRACT

An optical fiber holding device for holding optical fibers includes an assembling member and a base. The assembling member includes a top surface, a bottom surface opposite to the top surface, a front surface, and a rear surface opposite to the front surface. The front surface and the rear surface are interconnected between the top surface and the bottom surface. The front surface defines a number of receiving holes for receiving front portions of the optical fibers. The base includes an assembly portion and a support portion connecting the assembly portion. The assembly member is detachably mounted on the assembly portion. The support portion supports main portions of the optical fibers.

16 Claims, 5 Drawing Sheets

OPTICAL FIBER HOLDING DEVICE AND OPTICAL FIBER COUPLING CONNECTOR

FIELD

The subject matter herein generally relates to optic technologies and, particularly, to an optical fiber holding device and an optical fiber coupling connector.

BACKGROUND

An optical fiber coupling connector includes a number of light emitting modules, a number of light receiving modules, an optical fiber holding device for holding optical fibers, and an optical coupling lens coupled with the optical fiber holding device. The optical fibers are optically coupled with the light emitting modules and the light receiving modules via the optical coupling lens. The optical fiber holding device includes multi-fiber (MT) ferrule and fiber jumper types. The MT ferrule is a standard component and can be used in many occasions. The fiber jumper is cheap for simple manufacturing procedures.

BRIEF DESCRIPTION OF THE DRAWINGS

Implementations of the present technology will now be described, by way of example only, with reference to the attached figures.

DETAILED DESCRIPTION

Figure 1:
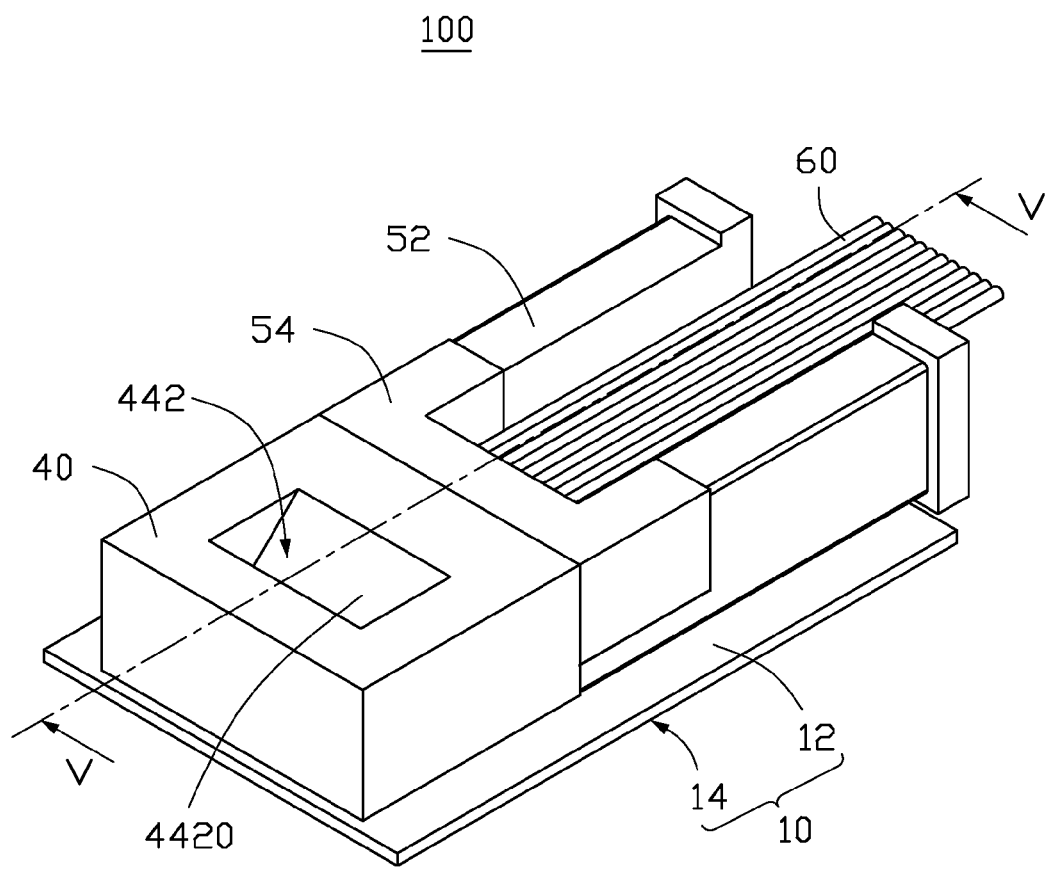
FIG. 1 is an isometric view of an exemplary embodiment of an optical fiber coupling connector.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Embodiments of present disclosure are described in relation to an optical fiber holding device for holding optical fibers. The optical fiber holding device includes an assembling member and a base. The assembling member includes a top surface, a bottom surface opposite to the top surface, a front surface, and a rear surface opposite to the front surface. The front surface and the rear surface are interconnected between the top surface and the bottom surface. The front surface defines a number of receiving holes for receiving front portions of the optical fibers. The base includes an assembly portion and a support portion connecting the assembly portion. The assembly member is detachably mounted on the assembly portion. The support portion supports main portions of the optical fibers.

Embodiments of the present disclosure are also described in relation to an optical fiber coupling connector. The optical fiber coupling connector includes a circuit board, a number of light emitting modules, a number of light receiving modules, an optical coupling lens all mounted on the circuit board and aligned with the light emitting modules and the light receiving module, a number optical fibers, and an optical fiber holding device coupled with the optical coupling lens. Each optical fiber includes a main portion and a front portion. The main portion consists of a core portion and a cladding portion surrounding the core portion. The core portion is exposed and forms the front portion. The optical fiber holding device includes an assembling member and a base. The assembling member includes a top surface, a bottom surface opposite to the top surface, a front surface, and a rear surface opposite to the front surface. The front surface and the rear surface are interconnected between the top surface and the bottom surface. The front surface defines a number of receiving holes for receiving the front portions of the optical fibers. The base includes an assembly portion and a support portion connecting the assembly portion. The assembly member is detachably mounted on the assembly portion. The support portion supports the main portions of the optical fibers.

Figure 2:
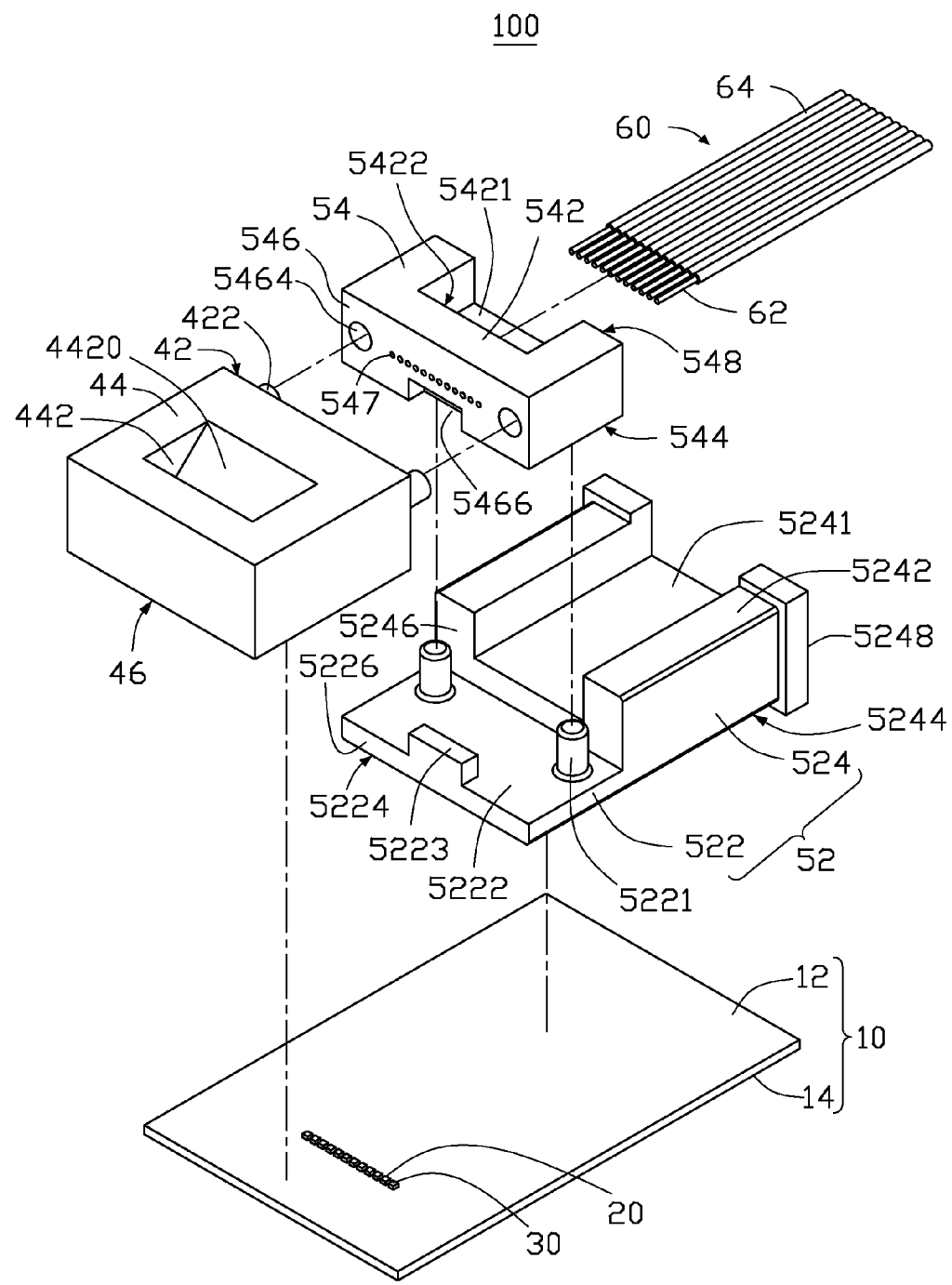
FIG. 2 is an exploded view of the optical fiber coupling connector of FIG. 1.

FIGS. 1 and 2 illustrate an exemplary embodiment of an optical fiber coupling connector 100. The optical fiber coupling connector 100 includes circuit board 10, six light emitting modules 20, six light receiving modules 30, an optical coupling lens 40, an optical fiber holding device 50, and twelve optical fibers 60.

The circuit board 10 includes an upper surface 12 and a lower surface 14. The upper surface 12 and the lower surface 14 are positioned at opposite sides of the circuit board 10, and the upper surface 12 is substantially parallel to the lower surface 14.

The light emitting modules 20 and the light receiving modules 30 are mounted on the upper surface 12, and are electrically connected to the circuit board 10. In detail, the light emitting modules 20 and the light receiving modules 30 are alternatively arranged in a straight line with each other. That is, a center of the light emitting module 20 and a center of the light receiving module 30 are arranged in a straight line. In this embodiment, each light emitting module 20 is a vertical cavity surface emitting laser (VCSEL) diode and is configured for emitting light beams. Each light receiving module 30 is a photo diode and is configured for receiving light beams and converting the light beams to electrical signals.

The optical coupling lens 40 is mounted on the upper surface 12. The optical coupling lens 40 is substantially a cuboid, and includes an alignment surface 42, a first surface 44, and a second surface 46. The first surface 44 and the second surface 46 are located at opposite sides of the optical coupling lens 40, and the first surface 44 is substantially parallel to the second surface 46. The alignment surface 42 is perpendicularly interconnected between the first surface 44 and the second surface 46. Two engagement posts 422 extend from the alignment surface 42. Each of the engagement posts 422 is substantially a cylinder. The first surface 44 defines a stripped recess 442 and has a triangular cross section. A reflection surface 4420 is located at a bottom of the recess 442. An included angle between the first surface 44 and the reflection surface 4420 is about 45 degrees, and an included angle between the reflection surface 4420 and the alignment surface 42 is about 45 degrees.

Figure 3:
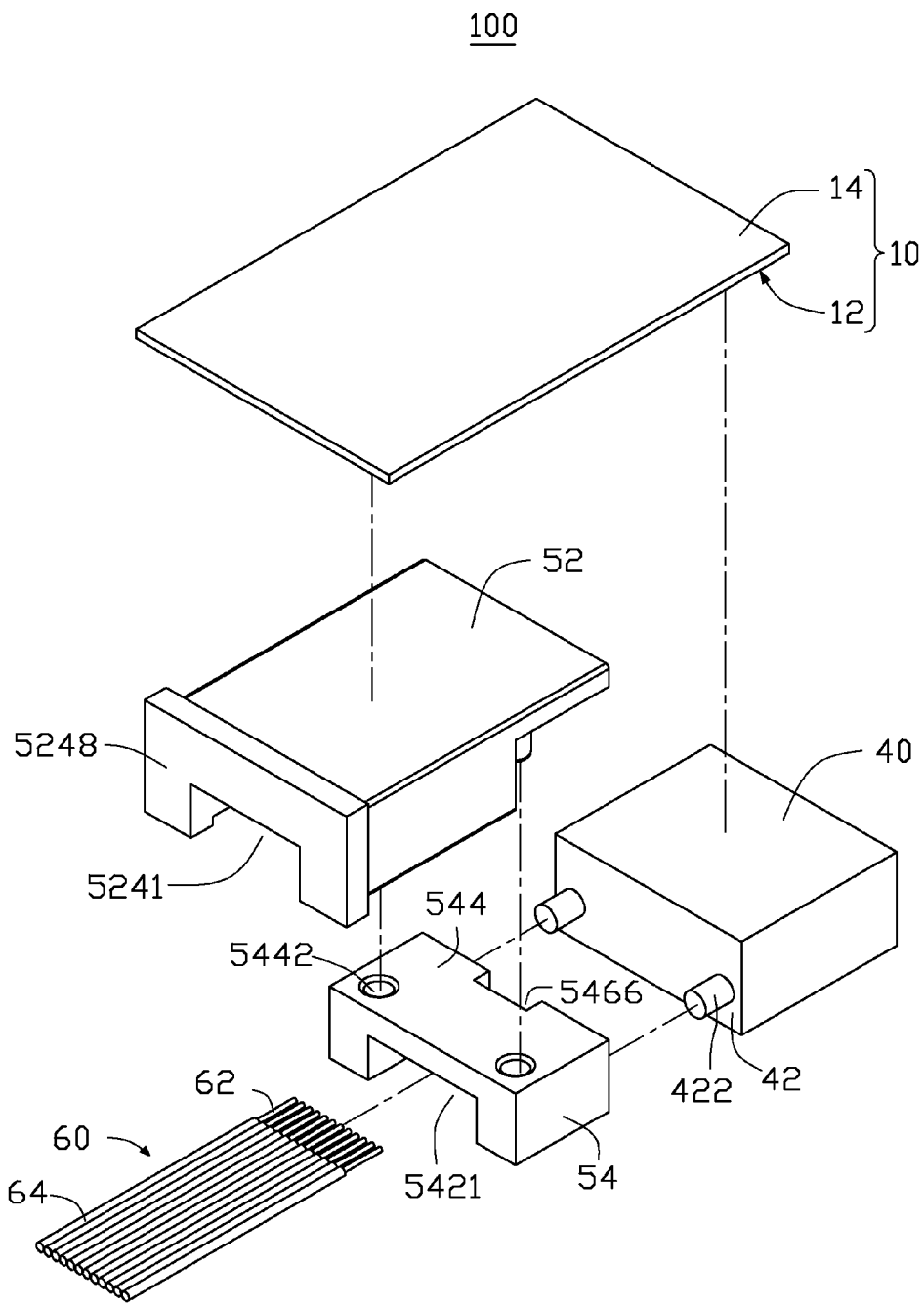
FIG. 3 is similar to FIG. 2, but viewed from alternative angle.
Figure 4:
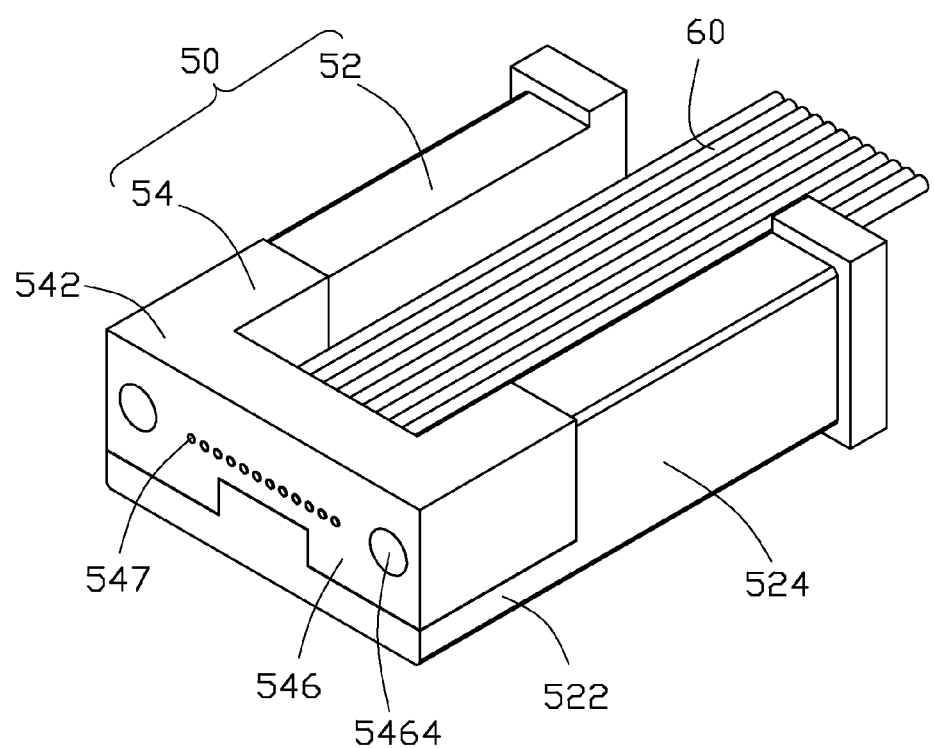
FIG. 4 is an isometric view of an exemplary embodiment of an optical fiber holding device of the optical fiber coupling connector of FIG. 1.

FIGS. 2-4 illustrate the optical fiber holding device 50 includes a base 52 and an assembling member 54. The base 52 is mounted on the circuit board 10, and the assembling member 54 is detachably assembled with the base 52.

The base 52 includes an assembly portion 522 and a support portion 524 connecting the assembly portion 522.

The assembly portion 522 is substantially a rectangular plate, and includes a first outer surface 5222, a second outer surface 5224, and a connection surface 5226. The first outer surface 5222 and the second outer surface 5224 are located at opposite sides of the assembly portion 522, and the first outer surface 5222 is substantially parallel to the second outer surface 5224. The connection surface 5226 is perpendicularly interconnected between the first outer surface 5222 and the second outer surface 5224. Two positioning posts 5221 and a protrusion 5223 perpendicularly extend from the first outer surface 5222. The two positioning posts 5221 are located at opposite sides of the first outer surface 5222, and the protrusion 5223 is located between the two positioning posts 5221 and adjacent to the connection surface 5226.

The support portion 524 is substantially a cuboid, and includes a third outer surface 5242, a fourth outer surface 5244, a fifth outer surface 5246, and a sixth outer surface 5248. The third outer surface 5242 and the fourth outer surface 5244 are positioned at opposite sides of the support portion 524, and the third outer surface 5242 is substantially parallel to the fourth outer surface 5244. The fifth outer surface 5246 and the sixth outer surface 5248 are positioned at opposite sides of the support portion 524, and the fifth outer surface 5246 is substantially parallel to the sixth outer surface 5248. The fifth outer surface 5246 and the sixth outer surface 5248 are perpendicularly interconnected between the third outer surface 5242 and the fourth outer surface 5244.

The fifth outer surface 5246 perpendicularly extends from the first outer surface 5222. The support portion 524 connects the assembly portion 522 at the fifth outer surface 5246. The third outer surface 5242 is higher than the first outer surface 5222. The third outer surface 5242 defines a first groove 5241. The first groove 5241 is substantially rectangular, and passes through the fifth outer surface 5246 and the sixth outer surface 5248.

The assembling member 54 is substantially a cuboid, and includes a top surface 542, a bottom surface 544, a front surface 546, and a rear surface 548. The top surface 542 and the bottom surface 544 are positioned at opposite sides of the assembling member 54, and the top surface 542 is substantially parallel to the bottom surface 544. The front surface 546 and the rear surface 548 are positioned at opposite sides of the assembling member 54, and the front surface 546 is substantially parallel to the rear surface 548. The front surface 546 is perpendicularly interconnected between the front surface 542 and the bottom surface 544, and the rear surface 548 is perpendicularly interconnected between the front surface 542 and the bottom surface 544.

The top surface 542 defines a rectangular top recess 5421. The top recess 5421 passes through the rear surface 548, but does not pass through the front surface 546. The assembling member 54 includes a front end surface 5422 in the top recess 5421. The front end surface 5422 is substantially parallel to the front surface 546. A distance between the front surface 546 and the front end surface 5422 is about 1 millimeter. The bottom surface 544 defines two positioning holes 5442 corresponding to the two positioning posts 5221. The front surface 546 defines twelve receiving holes 547, two engagement holes 5464, and a second groove 5466. The twelve receiving holes 547 are arranged in a straight line at an equal distance. The straight line is substantially parallel with the bottom surface 544. The distance between two neighboring receiving holes 547 is about 0.25 millimeters. The two engagement holes 5464 are circular blind holes, and align with the engagement posts 422. The second groove 5466 passes through the bottom surface 544, but does not pass the top surface 542.

Each optical fiber 60 includes a main portion 64 which is substantially circular in cross-section, and a concentric front portion 62. The main portion 64 consists of a core portion and a cladding portion surrounding the core portion. The front portion 62 consists of the core portion exposed, and the front portion 62 has a certain critical length. The front portion 62 is received in the receiving hole 547, and the main portion 64 is received in the top recess 5421 and the first groove 5241.

When the optical fibers 60 are received in the optical fiber holding device 50, first, the two positioning posts 5221 engage in the respective two positioning holes 5442, the protrusion 5223 engages in the second groove 5466, thereby assembling the assembling member 54 with the assembly portion 522, a bottom surface of the top recess 5421 is coplanar with a bottom surface of the second groove 5241, and the rear surface 548 contacts and is coplanar with the fifth outer surface 5246. Second, the front portions 62 are received in the respective receiving holes 547, and an output surface of each front portion 62 is coplanar with the front surface 546. In this situation, the top recess 5421 cooperates with the first groove 5241 to support the main portions 64. Third, adhesive is applied to the receiving holes 547, the top recess 5421, and the first groove 5241, thereby fixing the front portions 62 in the receiving holes 547, and fixing the main portions 64 in the top recess 5421 and the first groove 5241. The base 52 is a standard component and can be coupled with different assembling members 54 which define different receiving holes 547. In other embodiments, the base 52 can be omitted, and the assembling member 52 alone holds the optical fibers 60.

FIGS. 1-3 illustrate when the optical fiber coupling connector 100 is assembled, first, the light emitting modules 20 and the light receiving modules 30 are mounted on the upper surface 12. Second, the optical coupling lens 40 is mounted on the upper surface 12 and is aligned with the light emitting modules 20 and the light receiving modules 30. Third, the two engagement posts 422 engage in the respective engagement holes 5464, thereby assembling the optical fiber holding device 50 with the optical fibers 60 and the optical coupling lens 40.

Figure 5:
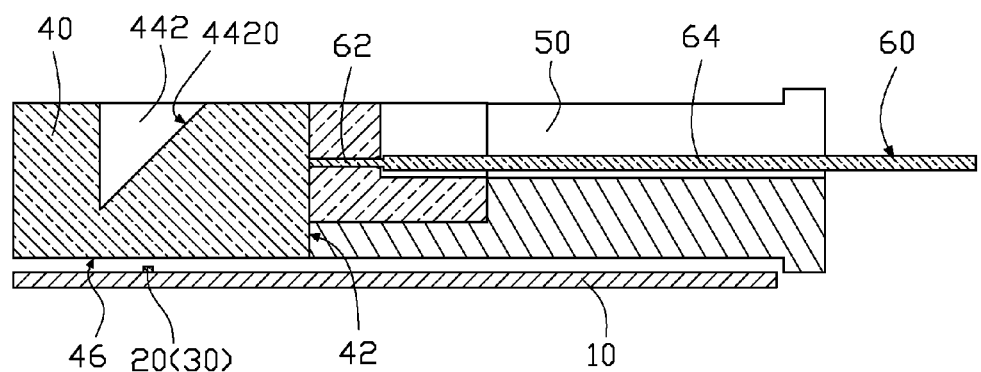
FIG. 5 is a cross sectional view of the optical fiber coupling connector, taken along line V-V of FIG. 1.

FIG. 5 illustrates when in use, electrical power is applied to the light emitting modules 20 and the light receiving modules 30 through the circuit board 10, thus light beams emitted from the light emitting modules 20 enter the optical coupling lens 40 through the second surface 46, and are then reflected about 90 degrees toward the alignment surface 42 by the reflection surface 4420, and finally reach on the output surfaces of the front portions 62 through the alignment surface 42. Accordingly, light beams from the optical fibers 60 enter the optical coupling lens 40 through the alignment surface 42, and are then reflected about 90 degrees toward the second surface 46, and are finally received by the light receiving modules 30. The light receiving modules 30 convert the light beams into electrical signals.

In other embodiments, the number of mounts of the light emitting module 20, of the light receiving module 30 are not limited to six, and can be changed according to requirements, such as, two, four, eight etc. Accordingly, the number of mounts of the optical fiber 60 is not limited to be twelve, and can be four, eight, sixteen etc. The sum of the number of mounts of the light emitting module 20 and the number of mounts of the light receiving module 30 is equal to the number of mounts of the optical fiber 60.

The embodiments shown and described above are only examples. Many details are often found in the art such as the other features of an optical fiber holding device and optical fiber coupling connector. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in the matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An optical fiber holding device for holding optical fibers, comprising:
    an assembling member comprising:
        a top surface;
        a bottom surface opposite to the top surface,
        a front surface; and
        a rear surface opposite to the front surface,
        wherein the front surface and the rear surface are interconnected between the top surface and the bottom surface, and the front surface defines a plurality of receiving holes for receiving front portions of the optical fibers; and
    a base comprising:
        an assembly portion; and
        a support portion connecting the assembly portion,
        wherein the assembly member is detachably mounted on the assembly portion, and the support portion is configured to support main portions of the optical fibers, and
        wherein the assembly portion comprises a first outer surface and a second outer surface opposite to the first outer surface, two positioning posts and a protrusion extend from the first outer surface, the assembling member defines two positioning holes and a groove, the two positioning posts engage the positioning holes, and the protrusion engages the groove of the assembling member.

2. The optical fiber holding device of claim 1, wherein the assembling member is capable of holding optical fibers.

3. The optical fiber holding device of claim 1, wherein the support portion comprises a third outer surface, a fourth outer surface opposite to the third outer surface, a fifth outer surface, and a sixth outer surface opposite to the fifth outer surface, the fifth outer surface and the sixth outer surface are interconnected between the third outer surface and the fourth outer surface, the third outer surface defines a groove for receiving the main portions of the optical fibers, and the groove of the support portion passes through the fifth outer surface and the sixth outer surface.

4. The optical fiber holding device of claim 3, wherein the top surface defines a top recess for receiving the main portions of the optical fibers, the top recess passes through the rear surface, and a bottom surface of the top recess is coplanar with a bottom surface of the groove of the support portion.

5. The optical fiber holding device of claim 4, wherein the assembling member comprises a front end surface in the top surface, the front end surface is substantially parallel to the front surface, and a distance between the front end surface and the front surface is about 1 millimeter.

6. The optical fiber holding device of claim 1, wherein the receiving holes are arranged in a straight line at an equal distance between two adjacent ones of the receiving holes, and the straight line is substantially parallel with the bottom surface.

7. The optical fiber holding device of claim 1, wherein the distance between two neighboring receiving holes is about 0.25 millimeters.

8. The optical fiber holding device of claim 1, wherein an output surface of each front portion is coplanar with the front surface.

9. An optical fiber coupling connector, comprising:
    a circuit board;
    a plurality of light emitting modules mounted on the circuit board;
    a plurality of light receiving modules mounted on the circuit board;
    an optical coupling lens mounted on the circuit board and aligning with the light emitting modules and the light receiving modules;
    a plurality of optical fibers, each optical fiber comprising a main portion and a front portion, the main portion consisting of a core portion and a cladding portion surrounding the core portion, the front portion consisting of the core portion exposed; and
    an optical fiber holding device coupled with the optical coupling lens, the optical fiber holding device comprising:
        an assembling member comprising a top surface, a bottom surface opposite to the top surface, a front surface, and a rear surface opposite to the front surface, the front surface and the rear surface interconnected between the top surface and the bottom surface, the front surface defining a plurality of receiving holes for receiving the front portions of the optical fibers; and
        a base comprising an assembly portion and a support portion connecting the assembly portion, the assembly member detachably mounted on the assembly portion, and the support portion supporting the main portions of the optical fibers, wherein the assembly portion comprises a first outer surface and a second outer surface opposite to the first outer surface, two positioning posts and a protrusion extend from the first outer surface, the assembling member defines two positioning holes and a groove, the two positioning posts engage the positioning holes, and the protrusion engages the groove of the assembling member.

10. The optical fiber coupling connector of claim 9, wherein the assembling member is capable of holding optical fibers.

11. The optical fiber coupling connector of claim 9, wherein the support portion comprises a third outer surface, a fourth outer surface opposite to the third outer surface, a fifth outer surface, and a sixth outer surface opposite to the fifth outer surface, the fifth outer surface and the sixth outer surface are interconnected between the third outer surface and the fourth outer surface, the third outer surface defines a groove for receiving the main portions of the optical fibers, and the groove of the support portion passes through the fifth outer surface and the sixth outer surface.

12. The optical fiber coupling connector of claim 11, wherein the top surface defines a top recess for receiving the main portions of the optical fibers, the top recess passes through the rear surface, and a bottom surface of the top recess is coplanar with a bottom surface of the groove of the support portion.

13. The optical fiber coupling connector of claim 12, wherein the assembling member comprises a front end surface in the top surface, the front end surface is substantially parallel to the front surface, and a distance between the front end surface and the front surface is about 1 millimeter.

14. The optical fiber coupling connector of claim 9, wherein the receiving holes are arranged in a straight line at an equal distance between two adjacent ones of the receiving holes, and the straight line is substantially parallel with the bottom surface.

15. The optical fiber coupling connector of claim 9, wherein the distance between two neighboring receiving holes is about 0.25 millimeters.

16. The optical fiber coupling connector of claim 9, wherein an output surface of each front portion is coplanar with the front surface.

* * * * *